United States Patent

[11] 3,631,678

[72] Inventor Jerry L. Reed
China Lake, Calif.
[21] Appl. No. 86,003
[22] Filed Nov. 2, 1970
[45] Patented Jan. 4, 1972
[73] Assignee The United States of America as represented by the Secretary of the Navy

[54] EXHAUST SYSTEM
9 Claims, 6 Drawing Figs.
[52] U.S. Cl. ................................................ 60/264,
60/39.5, 181/33 HC, 239/265.25
[51] Int. Cl. ............................................... F02k 1/26
[50] Field of Search ...................................... 60/271,
266, 265, 264, 263, 232, 231, 230, 229, 228,
39.66, 39.5, 31; 181/40, 33 HC, 58, 60, 67;
239/265.25

[56] References Cited
UNITED STATES PATENTS

| 2,633,703 | 4/1953 | Tenney et al. | 181/60 |
| 3,495,385 | 2/1970 | Glass | 60/31 |
| 3,393,767 | 7/1968 | Monk | 181/67 |
| 2,851,853 | 9/1958 | Quick | 60/264 |
| 3,025,667 | 3/1962 | Moorehead | 239/265.25 |
| 2,629,455 | 2/1953 | Cushman | 181/60 |
| 3,454,000 | 7/1969 | Everett | 181/60 |

FOREIGN PATENTS

| 45,124 | 6/1935 | France | 60/31 |

Primary Examiner—Mark M. Newman
Assistant Examiner—Warren Olsen
Attorneys—R. S. Sciascia, Roy Miller and Gerald F. Baker ABSTRACT: Exhaust systems with a group of exhaust tubes wherein the group of tubes contains a torsional rotation of 180° or more. The group is covered with an outer shroud and coolant is forced to flow in the interstices between tubes.

PATENTED JAN 4 1972

INVENTOR.
JERRY L. REED
BY ROY MILLER
ATTORNEY.
GERALD F. BAKER
AGENT.

EXHAUST SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Current technology devoted to the solution of passive infrared countermeasures (IRCM) for aircraft utilizing turboshaft and turbopropeller engines has been centered around the use of designs which employ a "plug" center body to optically mask the view of hot metal surfaces. However, since total airflow must be preserved to avoid large total pressure losses and static pressure gradients through the power turbine, the plug systems usually contribute to large changes in area over the standard tailpipe. Further, systems employing a plug and plenum have the following disadvantages:

a. Large changes in area thereby causing aircraft installation problems for new cowlings, and airframe skin or structural modifications.

b. The plug and plenum are constructed of porous metal material which creates manufacturing problems and a corresponding increase in the manufacturing unit cost.

c. The use of porous metals contributes to problems of clogging in a sandy and dusty environment. Clogging causes overheating of metal surfaces with a loss in IRCM capability. Ingestion of dust also requires the use of complicated and costly cleaning processes before the IRCM device can be reutilized.

d. The use of systems which employ plugs also have problems relating to weld strength, fatigue, poor vibration characteristics and complexity in repair when damaged.

SUMMARY OF THE INVENTION

The invention consists of a torsional flow convective (or film)-cooled metal infrared countermeasure. This concept consists of a series of passages with a discrete shape (circular, square, etc.) whose interiors are used as ducts for the engine exhaust gas flow. The interior of each duct is treated with a low-reflectance coating (in the 1.0 to 5.0 micron spectral region) thereby inducing an improved radiative heat transfer from the exhaust gases to the duct walls. Cooling air is forced through the gaps between each duct and is used to convectively cool, or film-cool, the walls. In the case of film cooling, portions of each section of each passage preferably contain thin slits to allow the coolant air to mix with the exhaust flow in the duct boundary layer region. The summation of all duct areas is aerodynamically matched to be equivalent to the effective diffuser area of the engine standard tailpipe.

To optically mask the hot engine parts from direct view, the tubes are rotated 180° or more about the torsional axis. This rotational helix preferably is matched to approximate the vectoral rotation angle of the exhaust gas flow path from the face of the rear turbine. Total pressure and static pressure gradients through the tubes may be controlled to insure optimum diffuser efficiency (including the effects of turbulent flow in each tube). Coolant air may be obtained from an auxiliary blowing system, through the use of "ram" air or by a combination thereof so that air is forced into the interstices between the tubes.

DESCRIPTION OF PRIOR ART, FIG. 1

Figure 1:
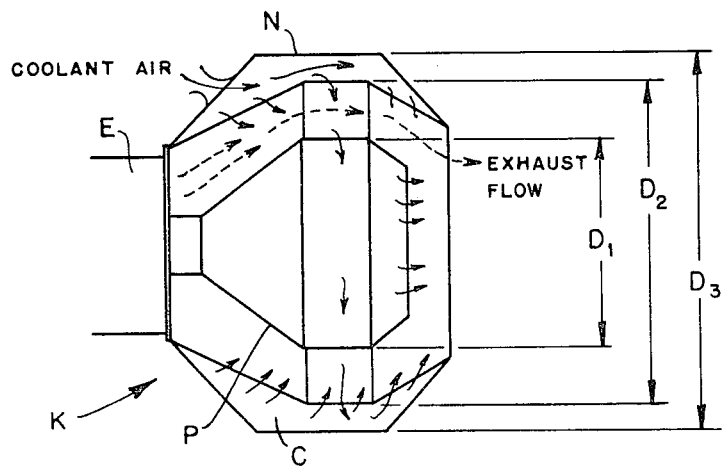
FIG. 1 is a schematic longitudinal cross-sectional view of a typical prior art device.

The FIG. 1 sketch is a schematic cross-sectional view of a typical turboshaft (and turbopropeller) engine E with an infrared countermeasure kit K. The system consists of a redesigned nozzle N which includes a plug-shaped inner body P and a plenum chamber C. This type of system utilizes a constant area flow (to reduce penalties in total pressure drop) therefore the diameter of the system is expanded well over that of a conventional tailpipe. The increases in total presented area and diameters over the conventional tailpipe are presented in the following calculations:

a. Area calculations (Tail-on aspect)

1. Area of current tailpipe $=\cong \pi(16.0)^2/4=202$ in.$^2$
2. Area of total system $=\cong \pi(24.5)^2/4=471.5$ in.$^2$ Increase in total area $+471.5-202=269$ in.$^2=133$ percent increase b. Diameter ratio $=24.5/16.0=1.531=53$ percent increase in clearance diameter ($D_3$).

DETAILED DESCRIPTION OF PREFERRED EMBODIMENTS OF THE INVENTION

Figure 2:
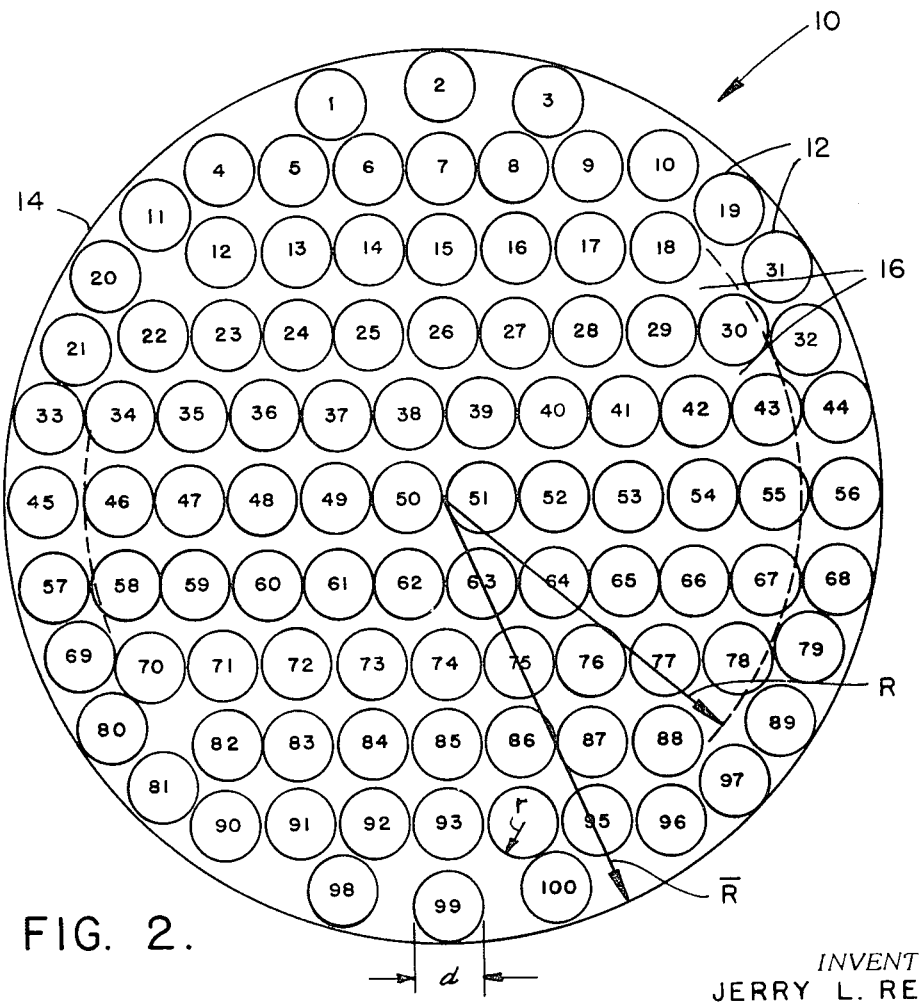
FIG. 2 is a schematic transverse cross-sectional view of one embodiment of the invention.

Torsional Concept No. 1 (FIG. 2)

This sketch is of the cross section of a system 10 which employs 100 tubes 12, each with a radius $r$, which equal 0.1 of the original major radius R.

Therefore:

$A_c$=Area of the major circle $=\pi R^2$ $T_T$=Areas of all minor circles $=\pi r^2(n)$ where $n$=number of tubes For constant area flow, $A_T=A_c$;

$\therefore n=\pi R^2/\pi r^2$;

$r=0.10R$; and $n=\pi R^2/\pi(0.1)^2 R^2 100$

Recognizing that some pressure drop will occur in the system an increase in the number of tubes is possible to offset this loss (up to a corrected flow efficiency of 0.95). The radius of the new circle, $\bar{R}$ has been increased by the addition of two tubes. Therefor: $\bar{R}=R+2r=R+0.2R=1.2R$, an increase of 20 percent; and Area ratio $=1.2R^2/R^2=1.44$, a 44 percent increase in area.

Figure 3:
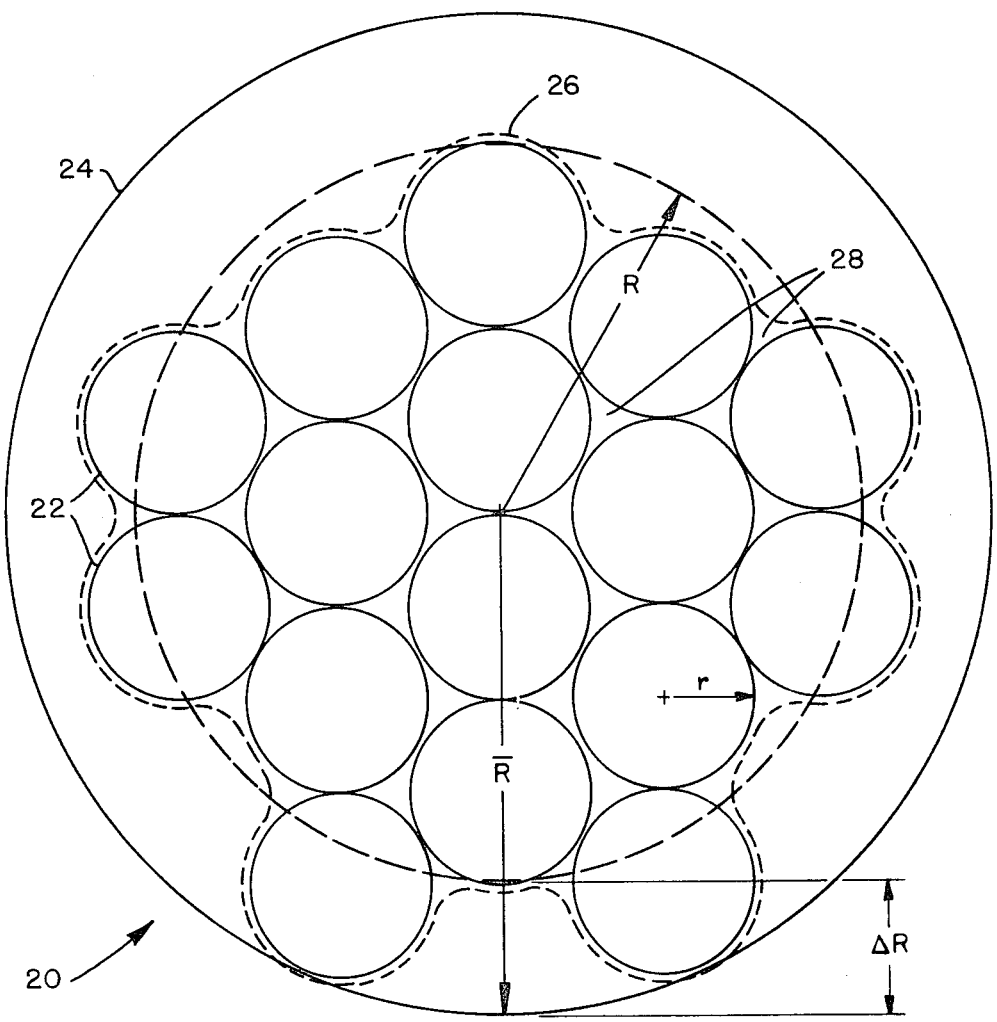
FIG. 3 is a schematic transverse cross-sectional view of a second embodiment.

Torsional Concept No. 2 (FIG. 3)

This is a sketch of the cross section of a second embodiment 20 which employs 16 tubes 22 of equal diameter. In this case the increase in radius ($\bar{R}-R$), $\Delta R$ is 36 percent of the two major axes. This concept utilizes inlet straighteners and fairings to cover the areas between tubes. An outer shroud 26 insures that the coolant flow through the flow ducts 28 between tubes would occur under constant pressure. All tubes 22 are twisted at a constant $d\theta/dl$. (radians per unit of tube length).

Tubes with a constant diameter or including diffusion could be used.

Figure 4:
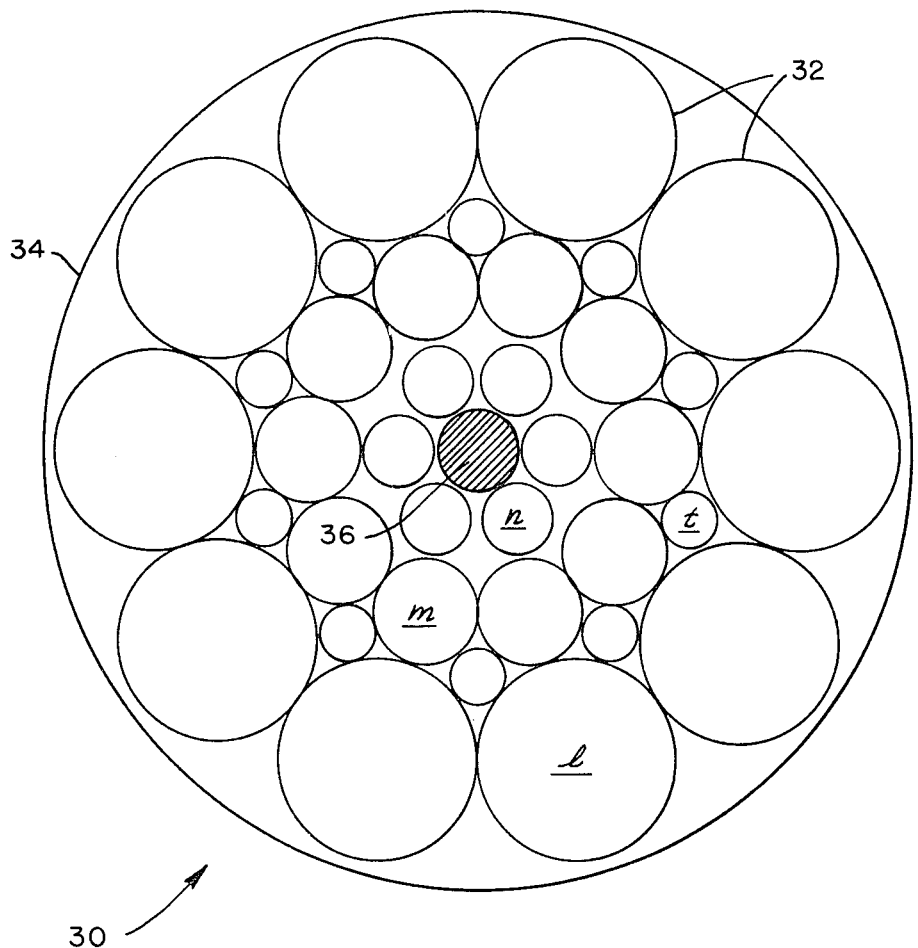
FIG. 4 is a schematic view of a third embodiment.

Torsional Concept No. 3 (FIG. 4)

This sketch is a typical cross section of a third embodiment 30 and employing a mixture of tubes 32, 32', ...32$^n$ with differing radii. The total area for a sample configuration would consist of:

$A_T=\pi(0.5)^2(10)+\pi(1.05)^2+\pi(2.05)^2(10)+\pi(0.75)^2 10/2$
$=263$ in.$^2$

The area ratio for a UH-1D helicopter engine $=263/203$ $=1.3$ or a 30 percent increase.

The center of this design includes a fairing 36 and all tubes could include inlet fairings (not shown). Variations in critical Reynolds numbers occur in each tube size. Coolant air may be positively pumped using flow parallel to each tube wall.

Figures 5, 6:
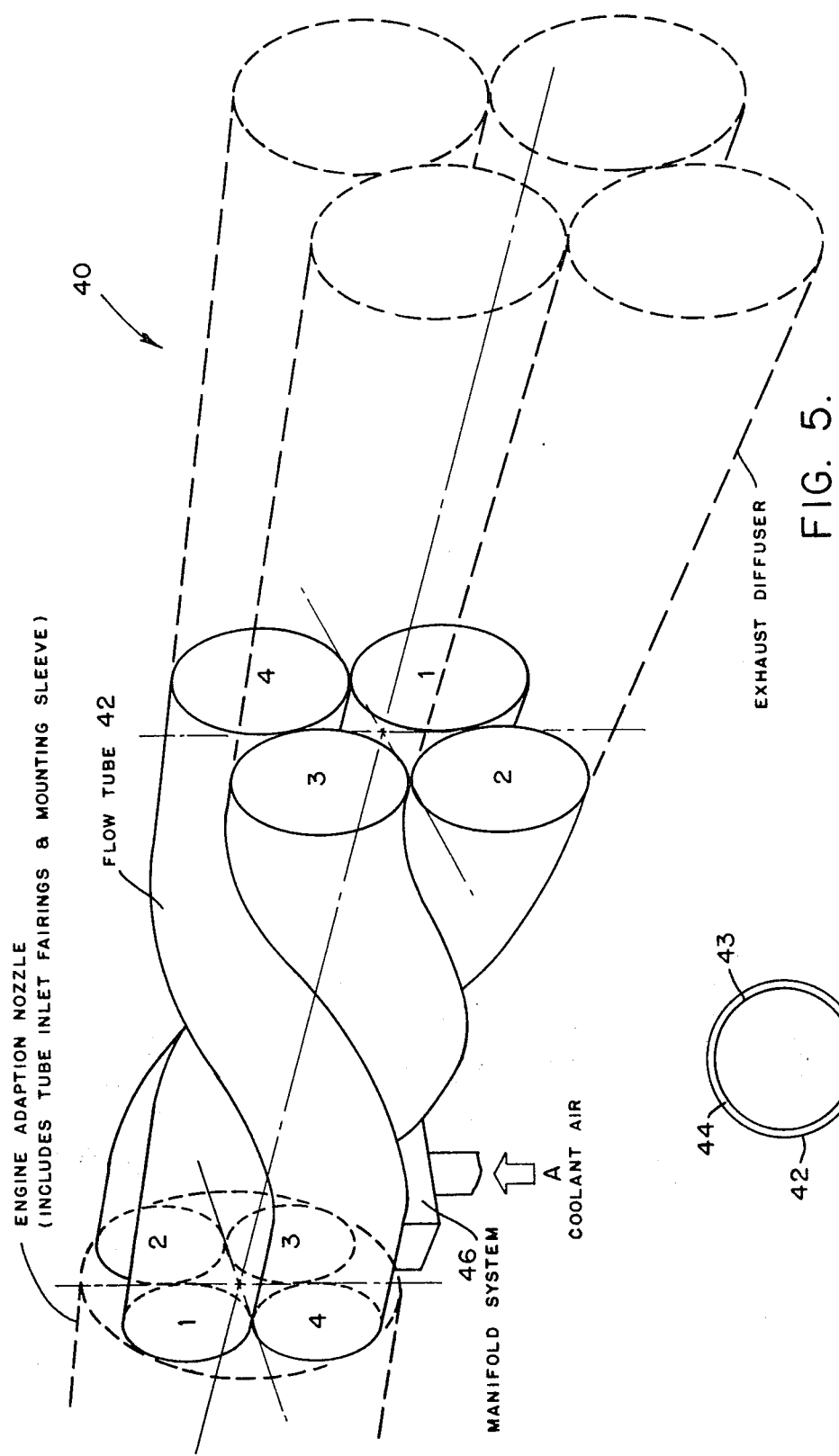
FIG. 5 is a schematic perspective view of a fourth embodiment.
FIG. 6 is a schematic cross-sectional view of a single tube.

Torsional Concept No. 4 (FIG. 5)

This sketch is of a four tube embodiment 40 having a convection cooled concept. The engine outlet flow is exhausted through the inner primary tube 43 (See FIG. 6) and diffusers 44; it is rotated through 180°. Coolant air arrow A is supplied through a manifold 46 into the gap 44 between the inner primary tube 43 and outer shield walls 42 where it convectively absorbs the thermal energy absorbed by the wall from the gas stream.

The system consists of (a) inner ducts 43 used as the primary tubes; (b) an outer tube wall 42; (c) exhaust diffusers 1, 2, 3, 4...; (d) a manifold system 46; and (e) an engine adaptation nozzle. Engine exhaust gases pass through the inner ducts 43 and are rotated 180° or more after which they are expanded through the exhaust diffusers. Ambient air is positively pumped into the manifold system and then passes through the annulus formed by the inner and the outer walls of the tubes. The entire system is attached to the engine by either a separate structural support or is cantilevered from the engine near flange. Initial engine exhaust flow is induced into the system by use of the adaptation nozzle.

ADVANTAGES AND NEW FEATURES

The concept embodied in these examples has the following advantages over the known prior systems:

a. Reduction in packaging size

The use of a multiple tubing enclosure with high density allows the total radius to stay within the present airframe structural and cowling limitations. For example: A UH-1D/H helicopter has an 18.0-inch-diameter clearance at the cowling exit; present IRCM kits require a new cowling, this concept would not require a new cowling and could fit within this envelope.

b. Improved Structural Integrity

The use of a solid metal construction (versus porous metals) will insure higher strength, better vibration and fatigue resistance and resistance to inflight loads. Weld strengths, joint stiffness, buckling strength and bending moment resistance will be significantly improved over current systems.

c. Ease of ManufaCturing

The use of sonic forming techniques and modern tooling procedures should provide a means to fabricate this concept at one third to one half the cast of the current system. Fewer components and the reduced number of fabrication steps will significantly lower the time and material required to produce one of these concepts as compared with the present IRCM techniques.

d. Environmental Hazards are reduced

The effects of dust ingestion are eliminated for these concepts since the coolant flow passages are very large compared to those of porous metals.

ALTERNATIVES

There are numerous alternatives to the basic concept:

a. Duct shape

The ducts can be square, hexagonal, tubular or of other symmetrical geometric shape.

b. Design variations

Concepts 1 through 4 show that the size and number of ducts can be varied based on the desired nozzle coefficient, allowable packaging diameter, heat transfer characteristics and other desired design parameters.

What is claimed is:

1. A turbine engine exhaust system comprising:

a tailpipe;

a plurality of exhaust tubes in said pipe;

said tubes being helically arranged in said pipe in such manner that airspaces are formed between said tubes and said pipe;

said tubes are rotated about the torsional axis at least 180° to mask hot engine parts; and means forcing coolant air through said air spaces.

2. An exhaust system according to claim 1 wherein interior surfaces of said tubes are treated with a low-reflectance coating.

3. An exhaust system according to claim 1 wherein said tubes comprise a plurality of spaced slits allowing coolant air to mix with exhaust flow in the boundary region within the tubes.

4. An exhaust system according to claim 3 wherein interior surfaces of said tubes are treated with a low-reflectance coating.

5. An exhaust system according to claim 1 wherein the summation of all tube areas is aerodynamically equivalent to the effective diffuser area of a designated engine.

6. An exhaust system according to claim 1 wherein the rotational helix of said tubes approximates the vectoral rotation angle of exhaust gas flow from a designated engine.

7. An exhaust system according to claim 6 wherein the summation of all tube areas is aerodynamically equivalent to the effective diffuser area of a designated engine.

8. An exhaust system according to claim 6 wherein interior surfaces of said tubes are treated with a low-reflectance coating.

9. An exhaust system according to claim 6 wherein said tubes comprise a plurality of spaced slits allowing coolant air to mix with exhaust flow in the boundary region within the tubes.

* * * * *